United States Patent
Sun et al.

(10) Patent No.: US 8,428,316 B2
(45) Date of Patent: Apr. 23, 2013

(54) CORONARY RECONSTRUCTION FROM ROTATIONAL X-RAY PROJECTION SEQUENCE

(75) Inventors: Yiyong Sun, Lawrenceville, NJ (US); Rui Liao, Plainsboro, NJ (US); Luc Duong, Montreal (CA); Frank Sauer, Princeton, NJ (US); Chenyang Xu, Allentown, NJ (US)

(73) Assignee: Siemens Aktiengesellschaft, München (DE)

( * ) Notice: Subject to any disclaimer, the term of this patent is extended or adjusted under 35 U.S.C. 154(b) by 1188 days.

(21) Appl. No.: 12/275,714

(22) Filed: Nov. 21, 2008

(65) Prior Publication Data
US 2009/0141968 A1    Jun. 4, 2009

Related U.S. Application Data

(60) Provisional application No. 60/991,909, filed on Dec. 3, 2007.

(51) Int. Cl.
*A61B 6/03* (2006.01)
(52) U.S. Cl.
USPC ............................ 382/128; 378/8; 600/424
(58) Field of Classification Search ............... 378/8; 382/128–132; 600/424
See application file for complete search history.

(56) References Cited

U.S. PATENT DOCUMENTS

| | | | | |
|---|---|---|---|---|
| 6,047,080 | A * | 4/2000 | Chen et al. | 382/128 |
| 2004/0066958 | A1 * | 4/2004 | Chen et al. | 382/128 |
| 2006/0285632 | A1 * | 12/2006 | Boese et al. | 378/8 |

FOREIGN PATENT DOCUMENTS
WO    WO 2007138526 A2 * 12/2007

OTHER PUBLICATIONS

Boykov et al., "Fast Approximate Energy Minimization via Graph Cuts", 2001, IEEE transactions on Pattern Analysis and Machine Intelligence, vol. 23, No. 11, pp. 1222-1239.*
Blondel et al., "4D deformation field of coronary arteries from monoplane rotational X-ray angiography", 2003, CARS, pp. 1073-1078.*
Blondel et al., "3D tomographic reconstruction of coronary arteries using a precomputed 4D motion field", 2003, Phys. Med. Biol. 49, 2197-2208.*
Blondel et al., Reconstruction of Coronary Arteries From a Single Rotational X-ray Projection Sequence, May 2006, IEEE Transactions on Medical Imaging, vol. 25, No. 5, pp. 653-663).*
Blondel et al., Automatic trinocular 3D reconstruction of coronary artery centerlines from rotational X-ray angiography, 2002, CARS 2002, pp. 832-837.*

* cited by examiner

*Primary Examiner* — Toan Ton
*Assistant Examiner* — John Corbett
(74) *Attorney, Agent, or Firm* — Donald B. Paschburg; F. Chau & Associates, LLC

(57) ABSTRACT

A method for three-dimensional reconstruction of a branched object from a rotational sequence of images of the branched object includes segmenting the branched object from each image of the sequence, extracting centerlines of the branched object, performing symbolic reconstruction via a stereo correspondence matching between the centerlines from different views of the sequence of images using a graph cut-based optimization, and creating a three-dimensional tomographic reconstruction of the branched object compensated for motion of the branched object between the images of the sequence.

20 Claims, 3 Drawing Sheets

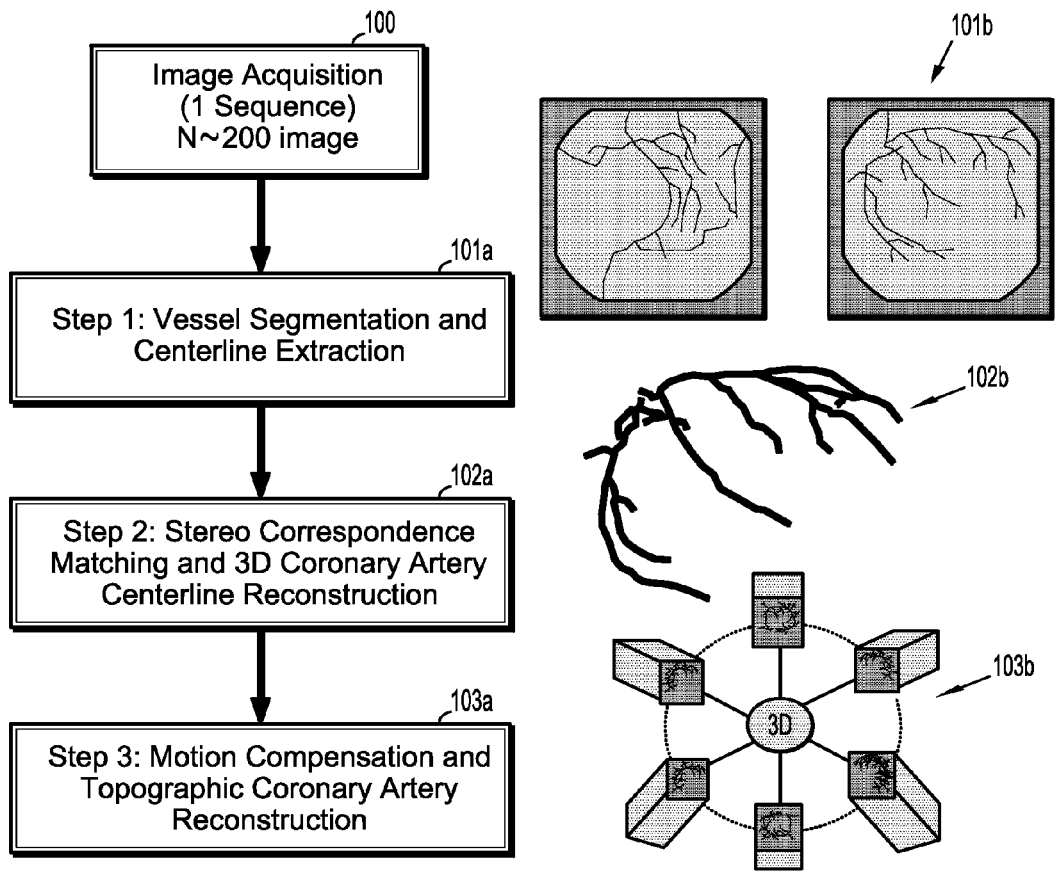
FIG. 1A     FIG. 1B
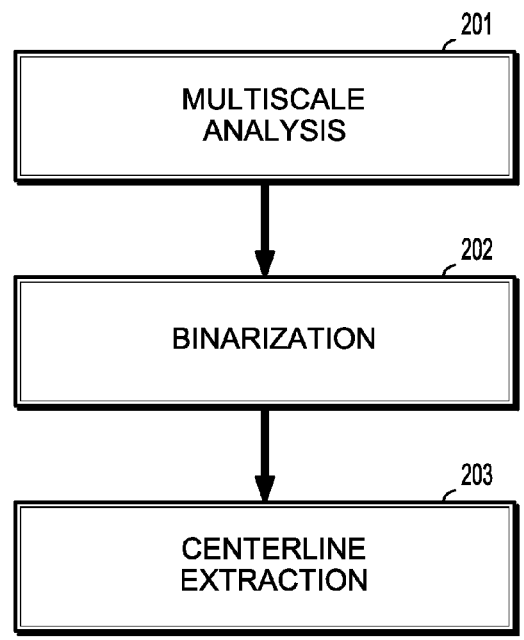
FIG. 2

US 8,428,316 B2

CORONARY RECONSTRUCTION FROM ROTATIONAL X-RAY PROJECTION SEQUENCE

CROSS-REFERENCE TO RELATED APPLICATIONS

This application claims the benefit of Provisional Application No. 60/991,909 filed on Dec. 3, 2007, filed in the United States Patent and Trademark Office, the contents of which is herein incorporated by reference in its entirety.

BACKGROUND

1. Technical Field

The present invention relates to image reconstruction, and more particularly, to a method for reconstruction from rotational projection sequences.

2. Discussion of Related Art

According to the American Heart Association, Cardiovascular Disease (CVD) is responsible for more than one third (36.3%) of total deaths in the United States in 2004. The gold standard for diagnosis of coronary artery disease, a commonly known CVD, is rotational x-ray angiography. Rotational x-ray angiography uses a contrast agent injected in the coronary arteries and a c-arm gantry rotating around the patient to provide a set of projection images from different angles. This x-ray examination of the coronary arterial tree is used to diagnose and locate defects, blockages and/or stenoses in the blood vessels. Since these measurements are based on a two-dimensional (2D) projection on a 2D plane of the coronary arteries, they represent a simplification of the real three-dimensional (3D) structures. Hence, visual interpretation based directly on 2D images suffers from inaccurate depth information and from superimposition effects.

Several approaches have been proposed to obtain a full volume 3D reconstruction from projection images. Filtered back projection algorithms from computerized tomography (CT) have been introduced to generate a 3D model based on the Feldkamp-Davis-Kress geometric settings for imaging of static objects. However, direct tomographic reconstruction of coronary arteries from a rotational X-ray sequence, in a CT-like manner, suffers from cardiac motion and respiratory motion shown in the rotational X-ray images, which can result in significant reconstruction artifacts. Dynamic 3D reconstruction of coronary arteries from biplane angiography has been investigated using two synchronized projections of the coronary tree and a manual identification of vessel's bifurcation point to refine the calibration of the camera system. But, in many cases, using only two projections is not sufficient to obtain automatically a precise reconstruction of the complicated coronary trees. The number of projections used for reconstruction can be increased by selecting the ones that correspond to the same cardiac phase from a rotational X-ray sequence. However, this results in discarding a large number of acquired images, or a prolonged acquisition time when a given number of views are needed for a satisfactory reconstruction.

Therefore a need exists for a method for reconstruction from rotational projection sequences.

BRIEF SUMMARY

According to an embodiment of the present disclosure, a method for three-dimensional reconstruction of a branched object from a rotational sequence of images of the branched object includes segmenting the branched object from each image of the sequence, extracting centerlines of the branched object, performing symbolic reconstruction via a stereo correspondence matching between the centerlines from different views of the sequence of images using a graph cut-based optimization, and creating a three-dimensional tomographic reconstruction of the branched object compensated for motion of the branched object between the images of the sequence.

According to an embodiment of the present disclosure, a system for three-dimensional reconstruction of a branched object from a rotational sequence of images of the branched object includes a source of the rotational sequence of images comprising views of the branched object to be reconstructed, a processor executing a instructions embodied in a computer readable medium for three dimensional reconstruction of the branched object from a symbolic reconstruction of the branched object in the rotational sequence of images, and a output device for display of the reconstructed branched object determined by the processor.

BRIEF DESCRIPTION OF THE DRAWINGS

Preferred embodiments of the present disclosure will be described below in more detail, with reference to the accompanying drawings:

FIG. 1A is a flow chart of a method for coronary reconstruction according to an embodiment of the present disclosure;

FIG. 1B is an illustration of a coronary reconstruction from rotational sequence according to FIG. 1A;

FIG. 2 is a flow diagram showing vessel segmentation and centerline extraction according to an embodiment of the present disclosure;

DETAILED DESCRIPTION OF PREFERRED EMBODIMENTS

Figure 3:
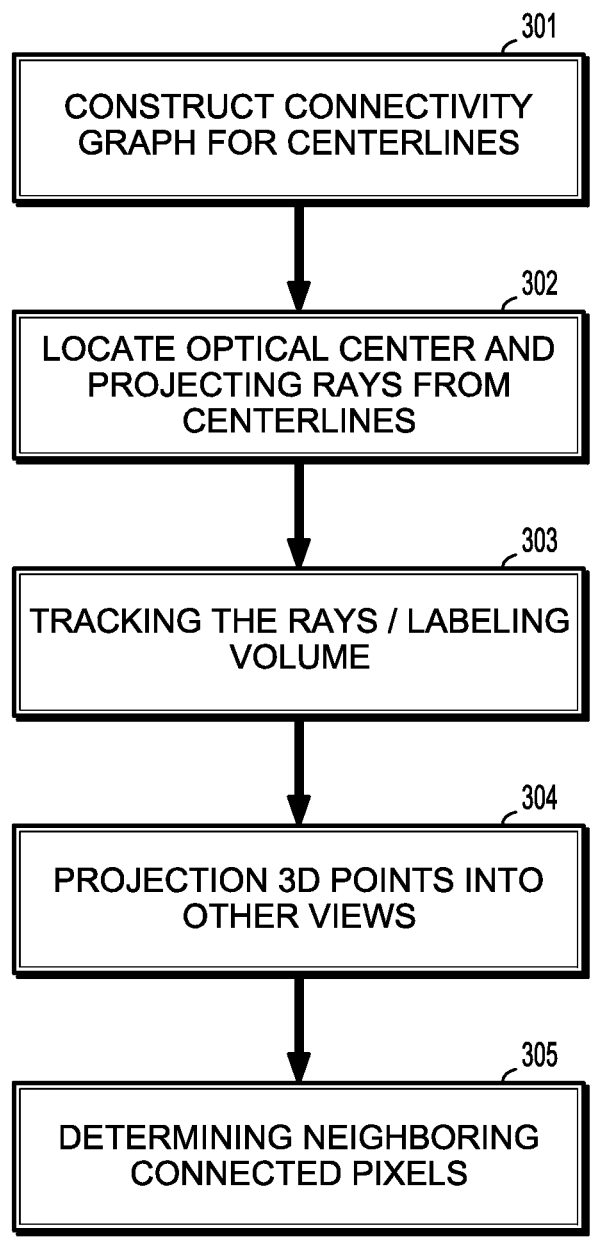
FIG. 3 is a flow chart of a graph cut-based optimization according to an embodiment of the present disclosure.

According to an embodiment of the present disclosure, a branching object, e.g., coronary artery tree, may be reconstructed in 3D from a single rotational X-ray projection sequence (block 100, FIG. 1A) containing several cardiac cycles. An exemplary method for reconstruction includes symbolic reconstruction of the branching object from a sequence of images, motion compensation throughout the sequence of images via affine transformation and tomographic reconstruction performed on the motion-compensated rotational sequence.

Referring to FIG. 1A coronary artery segmentation and centerline extraction are performed at block 101a (see also, 101b, FIG. 1B) As shown in FIG. 2, coronary arteries are segmented automatically from 2D X-ray images after vesselness enhancement 201 and binarization thresholding 202. The centerlines of the segmented coronary arteries are extracted 203 automatically using topological thinning. Manual editing of the extracted centerlines may be used for further adjustment.

More particularly, the segmentation and centerline extraction 101a includes a nonlinear diffusion technique, e.g., Coherence Enhanced Diffusion (CED). The diffusion equation can be given by:

$$\partial_t I(x;t) = \nabla \cdot (D \nabla I(x;t))$$

Here D is a diffusion tensor that depends on local image structures so that not only the amount, but also the direction of the diffusion can be regulated. t=3 was adopted for a trade-off between performance and efficiency. Multiscale Hessian-based filtering is applied on the CED preprocessed image to generate the vesselness feature image. The filter identifies the tubular structures using the eigenvalues $\lambda_1$ and $\lambda_2 |\lambda_1| \ll |\lambda_2|)$ of the Hessian matrix:

$$H_\sigma = \sigma^2 \begin{bmatrix} \frac{\partial^2 u_\sigma}{\partial x^2} & \frac{\partial^2 u_\sigma}{\partial_x \partial_y} \\ \frac{\partial^2 u_\sigma}{\partial x \partial y} & \frac{\partial^2 u_\sigma}{\partial y^2} \end{bmatrix}$$

Here $u_\sigma$ is the convolution of the CED preprocessed image with a Gaussian kernel of size σ. σ is the radius of the vessel of interest. To enhance all vessels with different diameters that need to be segmented, different scales (e.g., 3) are selected and their results combined by taking the maximum response for each pixel. The vesselness strength can be calculated as:

$$V_\sigma = \begin{cases} 0 & \lambda_2 < 0 \\ e^{R_B^2/2\beta^2}\left(1 - e^{-S^2/2\alpha^2}\right) & \lambda_2 \geq 0 \end{cases}$$

where $R_b = \lambda_1/\lambda_2$, $S = \sqrt{\lambda_1^2 + \lambda_{2us2}}$, and the vesselness orientation is calculated as the eigenvector corresponding to $\lambda_1$. Here α and β control the sensitivity of the filter and were set to 3 and 1, respectively.

Coronary arteries are segmented by a hysteresis thresholding process on the vesselness image that retains connected components with all points that have vesselness above a low threshold and with at least one pixel with vesselness above a high threshold. The low and high thresholds may be calculated as fixed quantiles (e.g., 90 and 96 percent) of the accumulated histogram of the vesselness image. Only large connected components are retained with a minimal size set to, for example, about 25 pixels. One of ordinary skill in the art would appreciate that different thresholds and sizes may be selected. The segmented coronary arteries can be hole-filled by close operation and the centerlines extracted automatically using topological thinning. For large vessels with local diameter variations, small braches may be produced artificially by topological thinning. Only sufficiently long branches are retained by pruning with a minimal branch length was set to, for example, about 5 pixels. Line linking is further performed according to their vesselness orientation and spatial location in order to connect those line segments that belong to the same vessel and are broken due to local vesselness discontinuity.

A method for interactive editing of the automatically extracted centerlines may be used for refinement. When user moves a pointer, the shortest path between a seed point (e.g. the root of the coronary tree) and the current pointer position is searched on-the-fly by Fast Marching method. A cost function (cost of a path L) may be written as:

$$C(L) = \sum_{p=1}^{m} 1/(0.001 + v(p)^4) + \omega S(L)$$

where v(p) is the vesselness at pixel p, m is the number of pixels on the path L, S(L) is the length of the path L, and ω controls the relative weights of these two factors (e.g., set to 50 experimentally). For the extraction of the smaller vessels to be less susceptible to the influence from the neighboring large vessels, a modified vesselness v(p) may be used. In particular, all points on the automatically extracted centerlines may be assigned the same (maximum) value for their vesselness, and the vesselness for the points not on the automatically extracted centerlines is their coherence enhanced multiscale vesselness response. Hence more accurate automatic centerline extraction leads to more convenient and robust semi-automatic editing. It can be seen that a path of stronger vesselness and shorter length is preferred over a path of weaker vesselness and a longer length.

Stereo correspondence matching and symbolic 3D reconstruction of the coronary artery centerline is performed at block 102a (see also 102b, FIG. 1B). The symbolic reconstruction results in an image of the branched object combining a plurality of views (e.g., cardiac phases) superimposed on one-another and optionally labeled. Images acquired from different angles at the same cardiac phase (e.g., at the end of diastole) are selected for the reconstruction of the 3D centerline of coronary arteries. Cardiac phases can be estimated either from electrocardiogram (ECG) signal or directly from the images by tracking the vertical motion of the arteries in the imaging plane. The symbolic reconstruction 102a via stereo correspondence between the points on the centerlines from different views is established by graph cut-based optimization (see FIG. 3).

Figure 4:
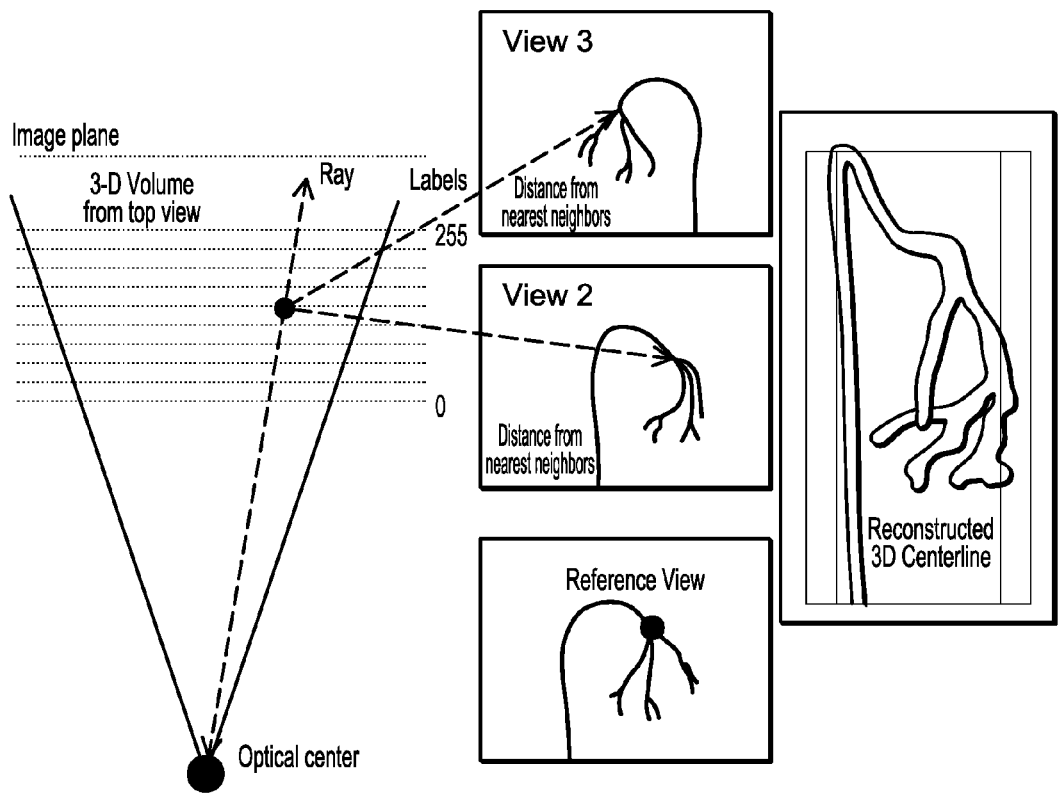
FIG. 4 is illustrates graph cut-based stereo correspondence matching and 3D centerline reconstruction according to an embodiment of the present disclosure.

FIG. 4 is a diagram of graph cut-based optimization for stereo correspondence matching, and the sample results of the reconstructed 3D centerline according to an exemplary embodiment of the present disclosure for a porcine data.

An exemplary embodiment of the graph cut-based optimization of block 102a and described in detail herein, is shown in FIG. 3, including constructing a connectivity graph for the centerlines extracted from a reference view 301; locating the optical center of the x-ray system, and projecting a 3D ray from optical center to the extracted centerlines in the reference view 302; tracking the ray in the 3D volume and attributing a label (0-255) according to the depth in the volume for each depth increment 303; projecting the 3D points onto the second, third and other views according to their respective projection matrices 304; and minimizing the mean of errors between the projected 2D points and the corresponding points on the centerlines extracted from other views 305. A smoothness criterion is formulated in a way that neighboring connected pixels should have similar depths.

Suppose the image sequence includes n views ($I_a \ldots I_n$) taken at the same cardiac phase and their corresponding acquisition geometry ($M_1 \ldots M_n$). One view ($I_1$) is selected as the reference view and its optical center is computed according to $M_1$. The 3D space between the optical center and the imaging plane is divided into 3D planes of equal depth increments, and a label l(l∈L) is attributed to each depth. Therefore, for a given pixel p on $I_1(p,l)$ corresponds to a point in 3D space, which is the intersection of plane and the ray passing through the optical center and pixel p. The mapping for all the pixels on the 2D centerline P extracted from $I_1$, $f:p \to f_p (p \in P, f_p \in I)$, is established via the minimization of the energy function:

$$E(f) = \sum_{p \in P} D_p(f_p) + \beta \sum_{p,q \in N} V_{p,q}(f_p, f_q)$$

wherein $$\sum_{p \in P} D_p(f_p)$$

is data term based on a 2D distance between projected 2D centerline and 2D centerline extracted from other views, and $$\sum_{p,q \in N} V_{p,q}(f_p, f_q)$$

is a smoothing term based on a difference between depths. $\beta$ is an optional control of the relative weights of the terms.

Here $D(\cdot)$ is the data term that encodes a soft epipolar line constraint:

$$D_p(f_p) = \frac{1}{n-1} \sum_{i=2}^{n} d(proj_i(p, f_p), c_i(proj_i(p, f_p)))$$

where $proj_i(p,f_p)$ is the projection of the 3D point $(p,f_p)$ onto the $i^{th}$ view, $c_i(r)$ is the point on the 2D centerline of the $i^{th}$ view that is closest to a given 2D point r, and $d(p,q)=\min(|p-q|,K_1)$ for some constant $K_1$. The cap $K_1$ (e.g., set to 20) makes the distance penalty robust when the corresponding stereo point is missing in some views. A kd-tree structure is implemented for an efficient search of the point $c_i(r)$ for any point r. While the data term favors 3D points that are closer to the epipolar lines, no hard epipolar line constraint is imposed. A soft epipolar line constraint allows a smoothness regularization to be optimized up to the accuracy of a small depth increment $\Delta L$ in 3D, which improves the smoothness of the reconstructed coronary tree in 3D.

The smoothness term $V(\cdot)$ involves the notion of neighborhood N:

$$N\{(p,q)p \in P, q \in P, |p_x - q_x| + |p_y - q_y| = 1\}$$

and $$V_{p,q}(f_p, f_q) = \begin{cases} \min(|f_p - f_q|, k_2) f_p, & f_q \notin B, \\ \min(|f_p - f_q|, k_3) & \text{otherwise} \end{cases}$$

where B denotes the union of branching points that have three or more neighboring points on the 2D centerline P in its eight-connection neighborhood. Higher smoothness penalty is imposed between non-branching points by $k_2 > k_3$ (e.g., $k_2=50, k_3=15$). Discontinuity at a branching point is allowed because it may be the intersection of two vessels at different depths. A smoothness penalty for non-branching is used to achieve a smooth 3D reconstruction. Furthermore, $V_{p,q}(\cdot)$ is a metric for any (p,g), satisfying a condition for $\alpha$-expansion move of the graph cuts optimization. q is the index of the pixel in the reference view; p and q denote any combination of two pixels in the reference view.

Referring to the graph cut-based optimization, consider a given input $f$ and a label $\alpha$, while another configuration $f'$ is defined to be within a single $\alpha$-expansion of $f$ when all pixels $p \in P$ either $f_p' = f_p$ or $f_p' = \alpha$. In the minimization of the energy function E by graph cuts the energy function E is locally decreased for a given configuration $f$ and a label a by finding the $f_p'$, among all $\alpha$-expansions of $f$, that minimizes the energy function E. Global searching of $f_p'$ for a given $f$ and $\alpha$ can be done by constructing a directed graph using the data term and smoothness term, and solving the maximum flow problem. This local improvement is run over all the labels in path L either in a fixed order or at random. If there is some label $\alpha$ that decreases the energy E, another circle of local improvements is repeated over all the labels. Otherwise the optimization process stops.

The rotational X-ray sequence can be acquired during free breathing, in which case estimation of respiratory motion (e.g., mostly translational in axial axis) needs to incorporated into the stereo correspondence matching (see block 102a, FIG. 1A), i.e., 3D reconstruction of coronary artery centerline.

Other methods such as contour-based stereo correspondence matching can also be applied for stereo correspondence matching of centerlines of coronary arteries from different views.

Referring to block 103a of FIG. 1A, motion compensation and tomographic reconstruction of coronary artery is performed. The reconstructed 3D centerline of the coronary artery is projected onto images acquired at other cardiac phases, and a 2D affine transformation including six independent parameters is estimated for each image to compensate for the cardiac motion in the 2D imaging plane by maximizing the vesselness along the centerline projections. An affine transformation is a linear transformation such that lines that are parallel before transformation remain parallel after transformation. Temporal smoothness of the estimated motion for consecutive views can be imposed by using the motion parameters estimated for a given view as the starting point for motion estimation for its subsequent view, and a regularity term that penalizes change in motion estimation for consecutive views can be added into a cost function to be optimized, which is the vesselness along the projected skeleton (e.g., centerlines). The motion compensated rotational X-ray sequence then can be used as the input for any tomographic reconstruction algorithm for 3D reconstruction of coronary artery.

Motion estimation for views acquired at the cardiac phase other than the one used for 3D centerline reconstruction can be done in 3D instead of directly in 2D. A parameterized 3D motion for the reconstructed 3D centerline is estimated for each view by maximizing the vesselness along the projection of the motion compensated 3D centerline. The temporal smoothness in the motion estimation for consecutive views is then imposed in 3D space instead of 2D correspondingly.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be understood that embodiments of the present disclosure may be implemented in various forms of hardware, software, firmware, special purpose processors, or a combination thereof. In one embodiment, a software application program is tangibly embodied on a program storage device.

The application program may be uploaded to, and executed by, a machine comprising any suitable architecture.

Figure 5:
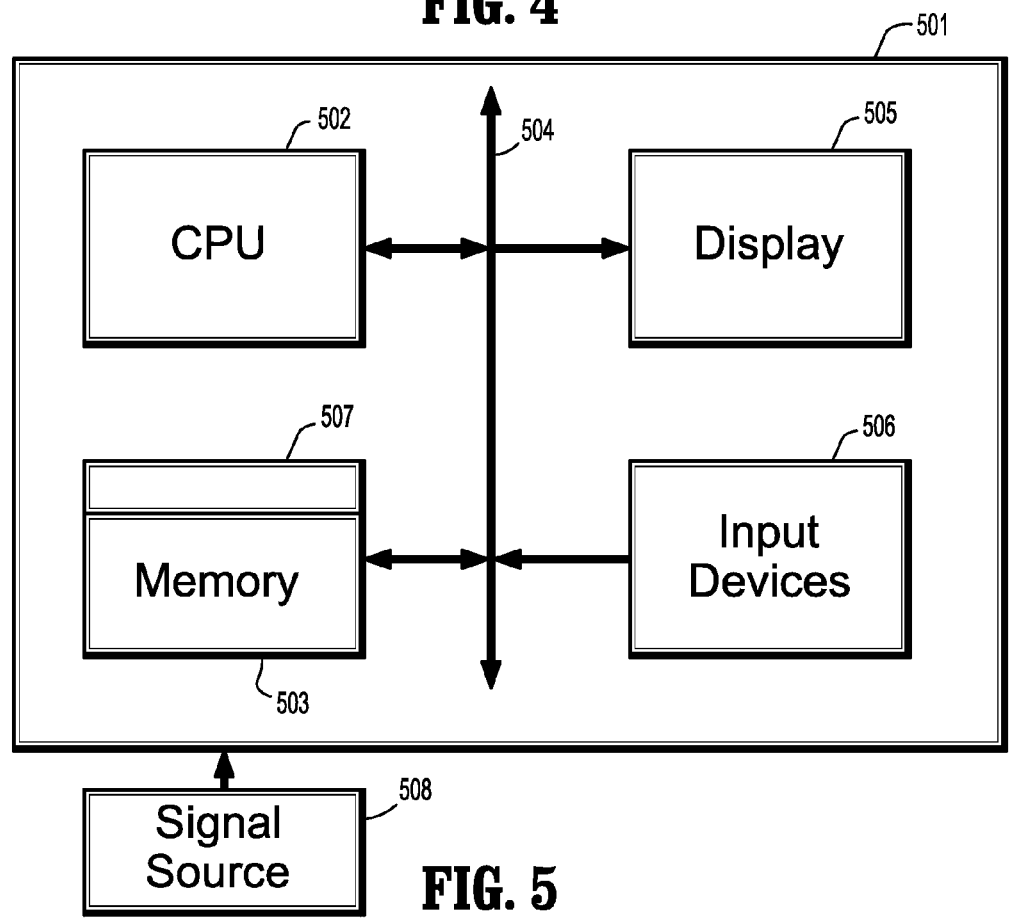
FIG. 5 is a diagram of a computer system for implementing a support framework according to an embodiment of the present disclosure.

Referring now to FIG. 5, according to an embodiment of the present disclosure, a computer system 501 for reconstruction from rotational projection sequences, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process the signal from the signal source 508. As such, the computer system 501 is a general purpose computer system that becomes a specific purpose computer system when executing the routine 507 of the present disclosure.

The computer platform 501 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for reconstruction from rotational projection sequences, it is noted that modifications and variations can be made by persons skilled in the art in light of the above teachings. It is therefore to be understood that changes may be made in embodiments of the present disclosure that are within the scope and spirit thereof.

What is claimed is:

1. A computer readable medium embodying instructions executable by a processor to perform a method for three-dimensional reconstruction of a branched object from a rotational sequence of images of the branched object, the method steps comprising:

generating a vesselness feature image for each image of the sequence by filtering each image of the sequence using a filter that identifies tubular structure;

segmenting the branched object from each vesselness feature image using a thresholding process;

extracting centerlines of the branched object;

performing symbolic reconstruction via a stereo correspondence matching between the centerlines from different views of the sequence of images using a graph cut-based optimization; and creating a three-dimensional tomographic reconstruction of the branched object compensated for motion of the branched object between the images of the sequence.

2. The computer readable medium of claim 1, wherein the graph cut-based optimization comprises:

constructing a connectivity graph for the centerlines extracted from a reference image selected from among the sequence of images;

locating an optical center in the reference image;

projecting a three-dimensional ray from optical center to the extracted centerlines in the reference image;

tracking the three-dimensional ray in a volume constructed from the sequence of images and labeling points on the ray at different depths according to a depth in the volume;

projecting the points onto another image according to a respective projection matrices; and minimizing a mean of errors between the projected points and corresponding points on the centerlines extracted from other images.

3. The computer readable medium of claim 2, wherein the graph cut-based optimization further comprises a smoothness penalty for neighboring connected pixels based on a difference in depth.

4. The computer readable medium of claim 2, wherein the graph cut-based optimization further comprises a cost penalty increasing with length of a corresponding centerline.

5. The computer readable medium of claim 2, wherein the graph cut-based optimization further comprises a cost penalty decreasing with a vesselness of a corresponding centerline.

6. The computer readable medium of claim 1, wherein creating the three-dimensional tomographic reconstruction further comprises estimating an affine transformation for each image of the sequence to compensate for the motion in a two-dimensional imaging plane.

7. The computer readable medium of claim 1, wherein a Multiscale Hessian-based filter is used in the filtering of each image of the sequence.

8. The computer readable medium of claim 1, wherein the thresholding process is a hysteresis thresholding process that retains connected components for points that have a vesselness above a low threshold and with at least one pixel with a vesselness above a high threshold.

9. The computer readable medium of claim 8, wherein the low and high thresholds are calculated as fixed quantities of accumulated histograms of the vesselness feature images.

10. A computer-implemented method for three-dimensional reconstruction of a branched object from a rotational sequence of images of the branched object comprising:

generating a vesselness feature image for each image of the sequence by filtering each image of the sequence using a filter that identifies tubular structure;

segmenting the branched object from each vesselness feature image of the sequence using a thresholding process;

extracting centerlines of the branched object;

performing symbolic reconstruction via a stereo correspondence matching between the centerlines from different views of the sequence of images using a graph cut-based optimization; and creating a three-dimensional tomographic reconstruction of the branched object compensated for motion of the branched object between the images of the sequence.

11. The method of claim 10, wherein the graph cut-based optimization comprises:

constructing a connectivity graph for the centerlines extracted from a reference image selected from among the sequence of images;

locating an optical center in the reference image;

projecting a three-dimensional ray from optical center to the extracted centerlines in the reference image;

tracking the three-dimensional ray in a volume constructed from the sequence of images and labeling points on the ray at different depths according to a depth in the volume;

projecting the points onto another image according to a respective projection matrices; and minimizing a mean of errors between the projected points and corresponding points on the centerlines extracted from other images.

12. The method of claim 11, wherein the graph cut-based optimization further comprises a smoothness penalty for neighboring connected pixels based on a difference in depth.

13. The method of claim 11, wherein the graph cut-based optimization further comprises a cost penalty increasing with length of a corresponding centerline.

14. The method of claim 11, wherein the graph cut-based optimization further comprises a cost penalty decreasing with a vesselness of a corresponding centerline.

15. The method of claim 10, wherein creating the three-dimensional tomographic reconstruction further comprises estimating an affine transformation for each image of the sequence to compensate for the motion in a two-dimensional imaging plane.

16. The computer-implemented method of claim 10, wherein a Multiscale Hessian-based filter is used in the filtering of each image of the sequence.

17. The computer-implemented method of claim 10, wherein the thresholding process is a hysteresis thresholding process that retains connected components for points that have a vesselness above a low threshold and with at least one pixel with a vesselness above a high threshold.

18. A system for three-dimensional reconstruction of a branched object from a rotational sequence of images of the branched object comprising:
    a source of the rotational sequence of images comprising views of the branched object to be reconstructed;
    a processor executing instructions embodied in a computer readable medium for three-dimensional reconstruction of the branched object from a symbolic reconstruction of the branched object in the rotational sequence of images; and
    an output device for display of the reconstructed branched object determined by the processor,
    wherein the instructions cause the processor to perform method steps comprising:
    generating a vesselness feature image for each image of the sequence by filtering each image of the sequence using a filter that identifies tubular structure;
    segmenting the branched object from each vesselness feature image using a thresholding process;
    extracting centerlines of the branched object;
    creating the symbolic reconstruction of the branched object via a stereo correspondence matching between the centerlines from different views of the sequence of images; and
    creating a three-dimensional tomographic reconstruction of the branched object compensated for motion of the branched object between the images of the sequence in the symbolic reconstruction.

19. The system of claim 18, wherein a Multiscale Hessian-based filter is used in the filtering of each image of the sequence.

20. The system of claim 18, wherein the thresholding process is a hysteresis thresholding process that retains connected components for points that have a vesselness above a low threshold and with at least one pixel with a vesselness above a high threshold.

* * * * *